United States Patent
Kellner et al.

(10) Patent No.: US 10,053,152 B2
(45) Date of Patent: Aug. 21, 2018

(54) SILL FOR A VEHICLE

(71) Applicant: Dr. Ing. h.c. F. Porsche Aktiengesellschaft, Stuttgart (DE)

(72) Inventors: Philipp Kellner, Weil der Stadt (DE); Tassilo Gilbert, Pforzheim (DE); Tobias Bongards, Ludwigsburg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/233,988

(22) Filed: Aug. 11, 2016

(65) Prior Publication Data

US 2017/0050675 A1   Feb. 23, 2017

(30) Foreign Application Priority Data

Aug. 20, 2015   (DE) .................. 10 2015 113 810

(51) Int. Cl.
*B62D 21/15*   (2006.01)
*B62D 25/02*   (2006.01)

(52) U.S. Cl.
CPC ........... *B62D 21/15* (2013.01); *B62D 25/025* (2013.01); *B62D 21/157* (2013.01)

(58) Field of Classification Search
CPC .... B62D 21/15; B62D 21/152; B62D 21/157; B62D 25/025; B62D 25/04
USPC .............................................. 296/187.1, 209
See application file for complete search history.

(56) References Cited

U.S. PATENT DOCUMENTS

| | | | | |
|---|---|---|---|---|
| 8,070,215 B2* | 12/2011 | Yoshioka | ............ | B62D 21/157 296/187.12 |
| 8,888,173 B2* | 11/2014 | Nydam | ................ | B62D 25/025 296/187.12 |
| 9,187,133 B2* | 11/2015 | Rangaswamaiah | .... | B62D 25/04 |
| 2010/0270830 A1* | 10/2010 | Maruyama | ............. | B62D 25/02 296/209 |
| 2010/0295336 A1 | 11/2010 | Itakura | | |
| 2012/0256448 A1 | 10/2012 | Yasui et al. | | |

FOREIGN PATENT DOCUMENTS

| | | |
|---|---|---|
| DE | 10028716 B4 | 6/2001 |
| DE | 102007032245 A1 | 1/2009 |
| DE | 102010022151 A1 | 11/2010 |
| DE | 102011085673 A1 | 5/2012 |
| EP | 1118528 A2 | 7/2001 |

* cited by examiner

*Primary Examiner* — Jason S Daniels
(74) *Attorney, Agent, or Firm* — Leydig, Voit & Mayer, Ltd.

(57) ABSTRACT

A sill for a body structure of a vehicle, in an installed state, extends substantially in the longitudinal direction of the vehicle. Outer, middle and inner sill parts are each of shell-like or hat-like cross section and have respective sill strengths. The outer sill part and the inner sill part are connected to one another at respective upper and lower ends thereof via flanges. A middle sill part is positioned between the outer sill part and the inner sill part. The middle sill part is connected at least to the inner sill part. At least in a region of a front section as viewed in the longitudinal direction of the vehicle, the outer sill part has a strength which is lower than a mean strength of the sill, which is dependent on the outer sill strength, the inner sill strength and the middle sill strength and masses thereof.

20 Claims, 3 Drawing Sheets

SILL FOR A VEHICLE

CROSS-REFERENCE TO PRIOR APPLICATION

Priority is claimed to German Patent Application No. DE 10 2015 113 810.7, filed on Aug. 20, 2015, the entire disclosure of which is hereby incorporated by reference herein.

FIELD

The invention relates to a sill for a vehicle.

BACKGROUND

EP 1 118 528 A2 has disclosed a sill for a vehicle with an outer sill part or outer plate, an inner sill part or inner plate and a middle sill part or reinforcing plate. The outer sill part and the inner sill part are connected to one another at flanges which extend in the longitudinal direction thereof. The middle sill part is positioned between the inner sill part and the outer sill part and is connected to the inner sill part.

SUMMARY

In an embodiment, the present invention provides a sill for a body structure of a vehicle which, in an installed state, extends substantially in the longitudinal direction of the vehicle. An outer sill part is of shell-like or hat-like cross section and has an outer sill strength. An inner sill part is of shell-like or hat-like cross section and has an inner sill strength. The outer sill part and the inner sill part are connected to one another at respective upper and lower ends thereof via flanges which extend in the longitudinal direction. A middle sill part is positioned between the outer sill part and the inner sill part, is of shell-like or hat-like cross section and has a middle sill strength. The middle sill part is connected at least to the inner sill part. At least in a region of a front section as viewed in the longitudinal direction of the vehicle, the outer sill part has a strength which is lower than a mean strength of the sill, which is dependent on the outer sill strength, the inner sill strength and the middle sill strength and masses thereof.

BRIEF DISCUSSION OF THE DRAWINGS

Figure 1:
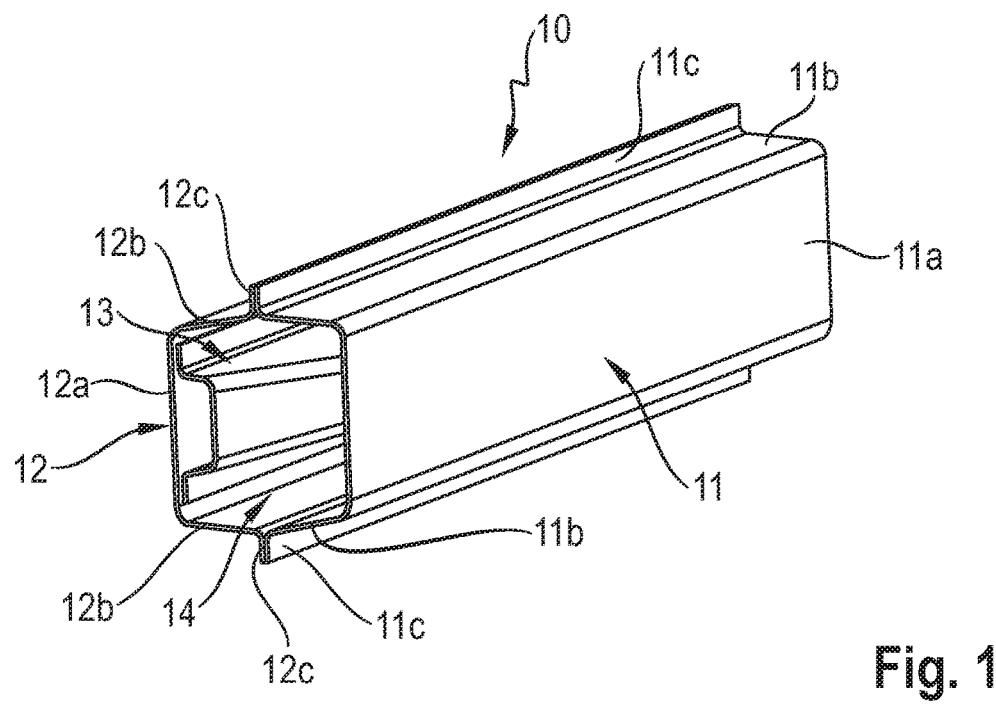
Figure 2:
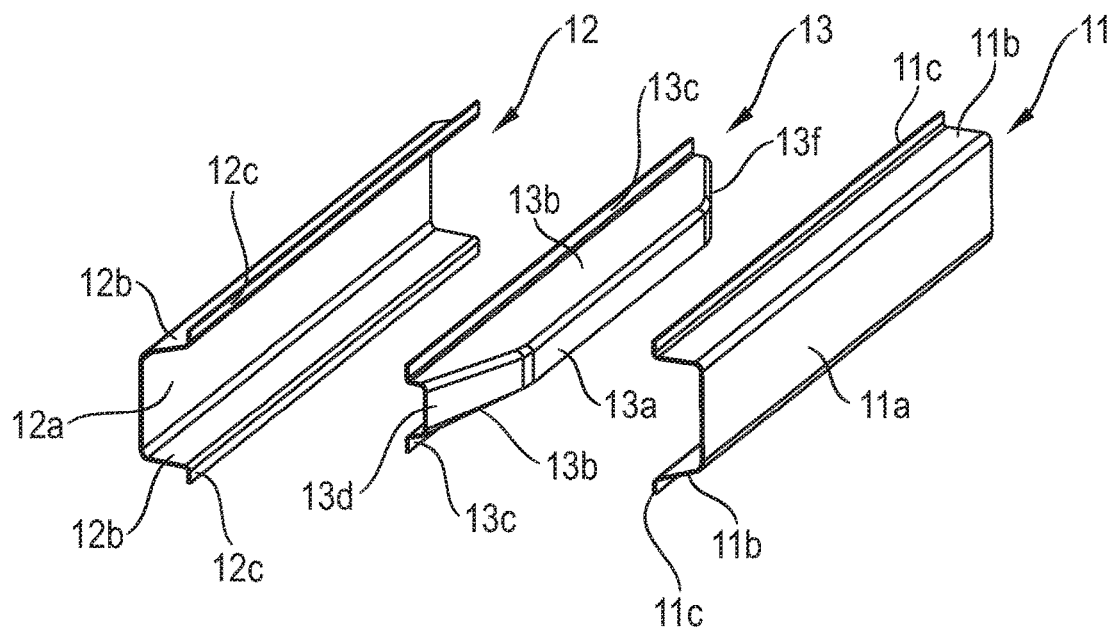
Figure 3:
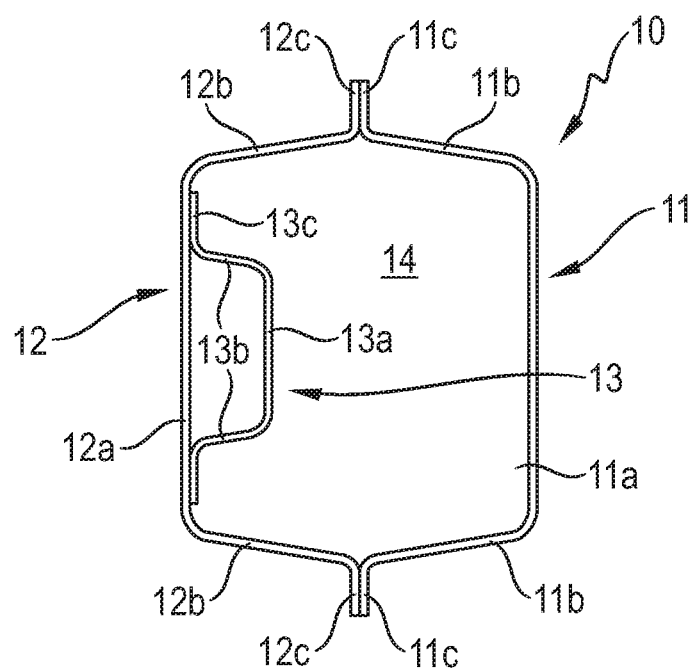
Figure 4:
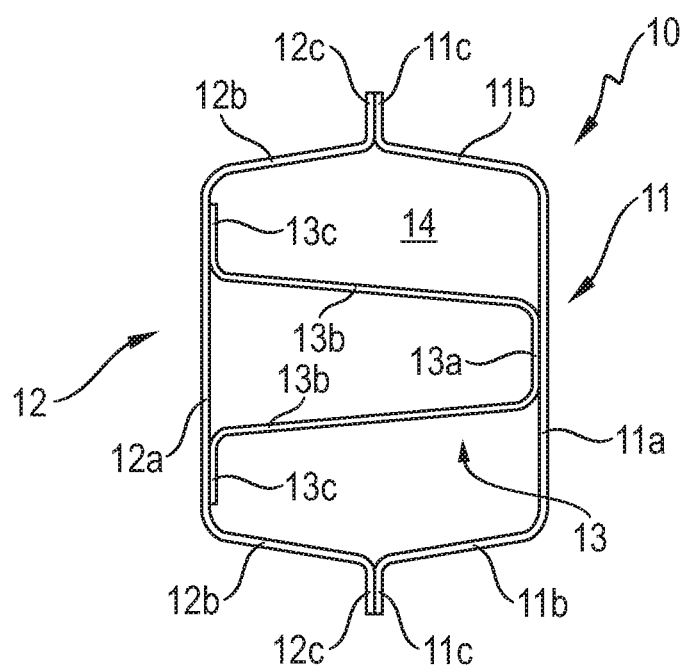
Figure 5:
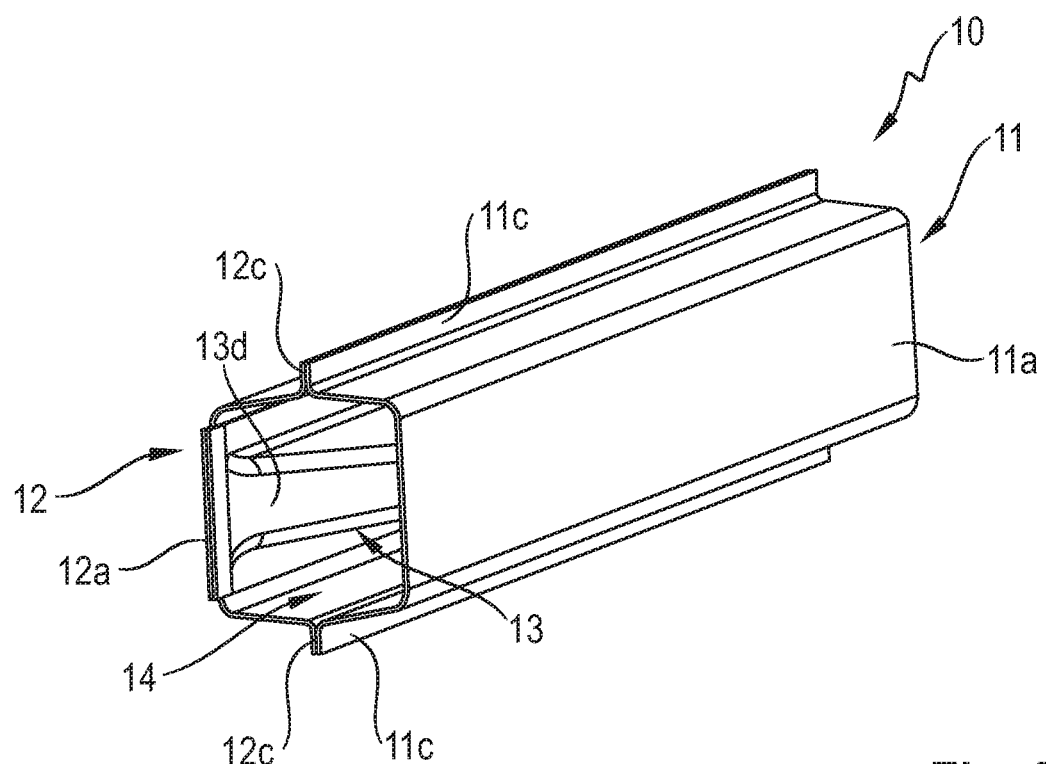
Figure 6:
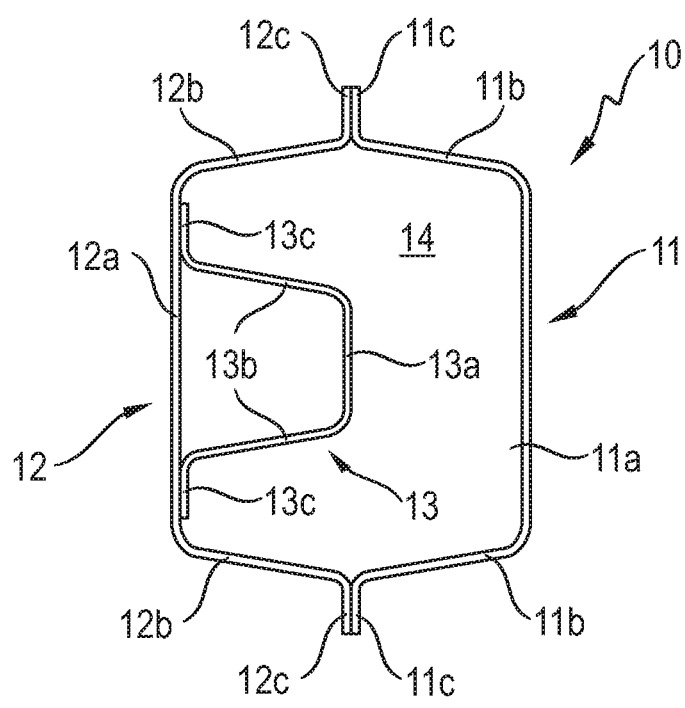

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a perspective view of a first sill according to an embodiment of the invention, FIG. 2 shows an exploded illustration of the sill from FIG. 1, FIG. 3 shows a first cross section through the sill from FIG. 1, FIG. 4 shows a second cross section through the sill from FIG. 1, which cross section is offset to the rear in the longitudinal direction in comparison with FIG. 1, FIG. 5 shows a perspective view of a second sill according to an embodiment of the invention, and FIG. 6 shows a cross section through the sill from FIG. 5.

DETAILED DESCRIPTION

In an embodiment, the present invention provides at least one sill for a body structure of a vehicle. The at least one sill extends substantially in the longitudinal direction of the vehicle and is designed in such a way that it ensures optimum protection of occupants of the vehicle, in particular in the case of a crash.

Here, the sill is designed to successfully pass various crash tests during the vehicle development, for example what is known as a pole crash test, in which the vehicle impacts a steel pillar laterally at the level of the driver at a defined speed. To this end, it is advantageous that the entire sill has a high strength.

In order to satisfy what is known as a small overlap crash test, in which the vehicle impacts a barrier frontally with a defined overlap and a defined speed, another embodiment of the sill is advantageous, in order to prevent the front wheel from penetrating into the passenger compartment.

No sills have been known up to now which have both optimum behavior in the case of a pole crash test and optimum behavior in the case of a small overlap crash test.

In an embodiment, the present invention provides a novel sill for a vehicle which is of optimum design both with regard to a pole crash test and with regard to a small overlap crash test.

According to an embodiment of the invention, at least in the region of a front section as viewed in the longitudinal direction of the vehicle, the outer sill part has a strength which is lower than a mean strength of the sill which is dependent on the outer sill strength, the inner sill strength and the middle sill strength and the masses thereof. As a result of this embodiment of the outer sill part in the region of the front section as viewed in the longitudinal direction of the vehicle, penetration of the front wheel into the passenger compartment in the case of a small overlap crash test can be prevented reliably. With a low weight, the sill has an optimum overall design for the small overlap crash and the pole crash.

At least in the region of a front section as viewed in the longitudinal direction of the vehicle, the inner sill part advantageously also has a strength which is lower than the mean strength of the sill. This embodiment of the inner sill part is also of significance for optimizing the sill with regard to the small overlap crash test and the pole crash test.

At least in the region of a front section as viewed in the longitudinal direction of the vehicle, the middle sill part has a strength which is lower than the mean strength of the sill; and/or, in the region of a front section as viewed in the longitudinal direction of the vehicle, the middle sill part is shortened in comparison with the outer sill part and the inner sill part; and/or, in the region of a front section as viewed in the longitudinal direction of the vehicle, the middle sill part has an extent which increases from the front to the rear as viewed in the transverse direction. By way of a middle sill part which is configured in this way, the sill can be optimized further with regard to the small overlap crash test and the pole crash test.

According to one embodiment, the outer sill part and the inner sill part have identical dimensions as viewed in the longitudinal direction; as viewed in the longitudinal direction, the middle sill part being shortened in the region of a front section in comparison with the outer sill part and the inner sill part; in that front section in which the middle sill part does not extend, the inner sill part having a lower strength than the mean strength of the sill; in the region of a front section as viewed in the longitudinal direction of the vehicle, the middle sill part having an extent which increases from the front to the rear with a ramp-like contour as viewed in the transverse direction, and, in that front section in which the middle sill part has the changing extent with the ramp-like contour in the transverse direction and in which the middle sill part does not extend, the outer sill part having a lower strength than the mean strength of the sill.

The combination of the above features of said advantageous development of the sill is particularly advantageous, in order to design the sill in an optimum manner both with regard to the small overlap crash test and with regard to the pole crash test and thus to ensure optimum occupant protection. The ramp-like contour on the middle sill part preferably forms a sliding surface for a front wheel of the vehicle in the case of a crash.

FIGS. 1 to 4 show details of a first exemplary embodiment of a sill 10 according to the invention for a body structure of a motor vehicle, the sill 10 extending substantially in the longitudinal direction of the motor vehicle.

The sill 10 has an outer sill part 11 which is of shell-like or hat-like cross section, an inner sill part 12 which is likewise of shell-like or hat-like cross section and a middle sill part 13 which is positioned between the outer sill part 11 and the inner sill part 12 and is likewise contoured so as to be shell-like or hat-like in cross section.

The outer sill part 11 is directed away from a passenger compartment of the motor vehicle, whereas the inner sill part 12 faces the passenger compartment of the vehicle.

The outer sill part 11 and the inner sill part 12 each have a middle segment 11a, 12a which are spaced apart from one another in the mounted state of the sill 10, extend in the longitudinal direction of the vehicle and in the vertical direction of the vehicle and define a cavity 14 of the sill.

Said middle segments 11a, 12a are joined at the top and the bottom by sections 11b, 12b which are drawn inward in the direction of the cavity 14 of the sill 10, extend substantially in the longitudinal direction and in the transverse direction of the vehicle and merge into flanges 11c, 12c at their free ends.

The outer sill part 11 and the inner sill part 12 are connected to one another at the top and bottom in the region of said flanges 11c, 12c, the flanges 11c, 12c, just like the middle segments 11a, 12a of the outer sill part 11 and the inner sill part 12, extending substantially in the longitudinal direction and in the vertical direction of the vehicle.

As has already been stated, the middle sill part 13 which is also called a sill reinforcement is arranged between the outer sill part 11 and the inner sill part 12. The middle sill part 13 likewise has a middle segment 13a which extends substantially in the longitudinal direction and in the vertical direction and flanges 13c which extend in the longitudinal direction and vertical direction, segments 13b which run substantially in the longitudinal direction and transverse direction of the vehicle extending between the flanges 13c which are formed on the middle sill part 13 at the top and bottom and the middle segment 13a.

The middle sill part 13 is connected via its flanges 13c to the inner sill part 12, namely to the middle segment 12a of the inner sill part 12. The middle sill part 13 is preferably also connected to the outer sill part 11, namely by virtue of the fact that the middle segment 13a of the middle sill part 13 is connected to the middle segment 11a of the outer sill part 11 (see FIG. 4).

The outer sill part 11 of the sill 10 has an outer sill strength. The inner sill part 12 of the sill 10 has an inner sill strength. The middle sill part 13 of the sill 10 has a middle sill strength. Further, said sill parts 11, 12, 13 have defined masses.

A mean strength of the overall sill 10 is dependent on the outer sill strength and the mass of the outer sill part 11, the inner sill strength and the mass of the inner sill part 12, and the middle sill strength and the mass of the middle sill part 13, and, in the same way, on further sill components.

When the sill 10 consists of the sill parts 11, 12 and 13, as shown in FIGS. 1 to 4, the mean strength $F_G$ of the sill 10 is calculated according to the following equation:

$$F_G = m_{11}/m_G * F_{11} + m_{12}/m_G * F_{12} + m_{13}/m_G * F_{13}$$

wherein $m_{11}$, $m_{12}$ and $m_{13}$ are the masses of the outer sill part 11, inner sill part 12 and middle sill part 13, wherein $F_{11}$, $F_{12}$ and $F_{13}$ are the strengths of the outer sill part 11, inner sill part 12 and middle sill part 13, wherein $F_G$ is the mean strength of the sill 10, and wherein $m_G$ is the overall mass of the sill 10.

In order then to ensure a sill 10 with optimum occupant protection in the case of a pole crash and small overlap crash, it is provided that, at least in the region of a front section of the outer sill part 11 as viewed in the longitudinal direction of the vehicle, the outer sill part 11 has a strength which is lower than the mean strength of the sill 10.

At least in the region of a front section of the inner sill part 12 as viewed in the longitudinal direction of the vehicle, the inner sill part 12 preferably also has a strength which is lower than the mean strength of the sill 10.

In a front section as viewed in the longitudinal direction of the vehicle, the middle sill part 13 can likewise have a strength which is lower than the mean strength of the sill 10.

Accordingly, the strengths $F_{11}$, $F_{12}$ and $F_{13}$ of the outer sill part 11, inner sill part 12 and middle sill part 13 are preferably also in each case mean strengths of the respective sill parts 11, 12 and 13 which are determined in each case in an analogous manner with respect to the mean strength $F_G$ of the sill 10 in a manner which is dependent on the masses of the sections of the respective sill parts 11, 12 and 13.

As an alternative or in addition, as viewed in the longitudinal direction of the vehicle, the middle sill part 13 can be shortened at the front section thereof in comparison with the outer sill part 11 and the inner sill part 12.

As an alternative or in addition, as viewed in the longitudinal direction of the vehicle, the middle sill part 13 can have an extent which increases from the front to the rear in the front section as viewed in the transverse direction, namely with the formation of a ramp-like contour 13d on the front section of the middle sill part 13. According to FIG. 2, a ramp-like contour 13f of this type is also configured on the rear section of the middle sill part 13 as viewed in the longitudinal direction of the vehicle, the extent of which ramp-like contour 13f decreases from the front to the rear as viewed in the transverse direction.

One embodiment of the sill 10 is particularly preferred, in which the outer sill part 11 and the inner sill part 12 have identical dimensions and accordingly lengths as viewed in the longitudinal direction, whereas the middle sill part 13 has a shortened length, namely in such a way that the middle sill part 13 is shortened at the front as viewed in the longitudinal direction in comparison with the outer sill part 11 and the inner sill part 12.

Although it is preferred that the outer sill part 11 and the inner sill part 12 have identical dimensions and accordingly lengths as viewed in the longitudinal direction, it is also possible that the outer sill part 11 is shorter than the inner sill part 12 and longer than the middle sill part 13.

Furthermore, it is provided according to the preferred variant of the sill 10 that the inner sill part 12 has a lower strength in that front section, in which the middle sill part 13 does not extend, in which there is therefore no overlap between the inner sill part 12 and the middle sill part 13, than the mean strength of the sill 10.

According to the preferred embodiment of the sill 10, in its front section and/or region, the middle sill part 13 has the ramp-like contour, to which end the front section of the middle sill part 13 which is offset toward the rear or shortened in comparison with the front sections of the outer sill part 11 and inner sill part 12, as viewed in the transverse direction, has the extent which increases from the front to the rear.

According to the preferred embodiment of the sill 10, in that front section in which the middle sill part 13 of the sill 10 has the ramp-like contour or changing extent in the transverse direction and in which the middle sill part 13 of the sill 10 does not extend, the outer sill part 11 of the sill 10 has a lower strength than the mean strength of the sill 10.

According to the preferred embodiment, the front section of the outer sill part 11, in which the latter has the lower strength than the mean strength of the sill 10, is accordingly longer than the front section of the inner sill part 12, in which the latter has the lower strength than the mean strength of the sill 10.

The strength in the front section of the inner sill part 12 can correspond to the strength in the front section of the outer sill part 11 or can deviate from it.

As a result of the combination of said features according to the preferred embodiment of the sill 10 according to the invention, an optimum behavior of said sill 10 can be ensured for what is known as the small overlap crash and for a pole crash. At the front, the sill 10 has a low strength and preferably higher breaking elongation than in middle and rear sections thereof.

According to the preferred embodiment of the sill, this is ensured by way of the above-described, defined refinement of the outer sill part 11, inner sill part 12 and middle sill part 13 in the region of their front sections as viewed in the longitudinal direction. As a result of the lower strength of the outer sill part 11 in the front section, said outer sill part 11 can be deformed in a defined manner during the small overlap crash, and can thus dissipate energy of a front wheel and ensure the front wheel slides along the ramp-shaped contour 13d on the front section of the middle sill part 13.

Accordingly, that region of the middle sill part 13 which has the increasing extent as viewed in the transverse direction from the front to the rear and accordingly forms the ramp-like contour 13d provides a sliding surface for the front wheel of the vehicle in the case of a crash. With a low weight of the sill 10, said sill 10 can provide optimum occupant protection.

In the exemplary embodiment of FIGS. 1 to 4, the sill 10 which comprises the outer sill part 11, the inner sill part 12 and the middle sill part 13 is open at the front and rear, namely both between the outer sill part 11 and middle sill part 13 and also between the middle sill part 13 and inner sill part 12, the latter preferably being closed at the front and rear by way of what are known as closing plates. Accordingly, in the exemplary embodiment of FIGS. 1 to 4, the middle sill part 13 is contoured in such a way that, if the closing plates are removed, a part space of the cavity 14 which is enclosed between the inner sill part 12 and the middle sill part 13 and a part space of the cavity 14 which is enclosed between the outer sill part 11 and the middle sill part 13 are open at the front and rear.

In the exemplary embodiment of FIGS. 1 to 4, the middle sill part 13 is connected both to the inner sill part 12 and to the outer sill part 11, for example by way of spot welding and/or adhesive bonding. As has already been stated, the middle sill part 13 is connected via its flanges 13c to the middle segment 12a of the inner sill part 12, whereas the middle sill part 13 is connected by way of its middle segment 13a to the middle segment 11a of the outer sill part 11.

FIGS. 5 and 6 show details of a second exemplary embodiment of a sill 10 according to the invention, the exemplary embodiment of FIGS. 5 and 6 differing from the exemplary embodiment of FIGS. 1 to 4 merely in that firstly the middle sill part 13 of the sill 10 is contoured at its front and rear section in such a way that, if the closing plates are removed, said middle sill part 13 closes the part space of the cavity 14 which is configured between the inner sill part 12 and the middle sill part 13 at the front and rear with the formation of vertical flanges, and in that secondly the middle sill part 13 of the sill 10 is connected exclusively to the inner sill part 12, but not to the outer sill part 11.

With regard to all remaining details, the exemplary embodiment of FIGS. 5 and 6 corresponds to the exemplary embodiment of FIGS. 1 to 4, with the result that identical designations are used for identical assemblies and reference is made to the above comments in order to avoid unnecessary repetitions.

The outer sill part 11, inner sill part 12 and middle sill part 13 can be configured from steel plate or aluminum plate. Said sill parts are preferably manufactured from a steel plate. As already stated, according to the preferred exemplary embodiment, the outer sill part 11 and the inner sill part 12 and possibly the middle sill part 13 are configured at their front sections in such a way that they have a lower strength there than the mean strength of the sill 10, with the result that they accordingly have a higher strength in a middle region and rear regions than at their front sections.

This can be ensured by the fact that said sill parts 11, 12 and possibly 13 are formed either in the shape of what are known as welded plates, which is known under the term "tailor welded blank", or the different sections are configured with the different strengths by way of correspondingly adapted heat treatments during thermal reshaping and/or press hardening, which is also known under the term "tailored tempering". As an alternative or in addition, the higher strengths in the middle and rear sections of the sill components can be ensured by the fact that additional components are connected there to the inner sill part 12 and/or the outer sill part 11.

The sill according to the invention is a constituent part of a body structure of a vehicle, extends in the body structure in the longitudinal direction of the vehicle, and provides optimum occupant protection in the case of a small overlap crash and a pole crash. In the case of the pole crash, middle and rear sections or regions of the sill 10 are active, whereas, in the case of the small overlap crash, a front section of the respective sill 10 is active, to be precise in such a way that the softer front section in the region of the outer sill part 11 and preferably also the softer front section in the region of the inner sill part 12 which have a lower strength and higher breaking elongation absorb energy and, in particular assisted by way of the ramp-like contour in the front region of the middle sill part 13 which is set back toward the rear in comparison with the front regions of the inner sill part 12 and outer sill part 11, deflect the front wheel of the vehicle in a defined manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sill for a body structure of a vehicle, the sill, in an installed state, extending substantially in a longitudinal direction of the vehicle, the sill comprising:
   an outer sill part which is of shell-like or hat-like cross section and has an outer sill strength;
   an inner sill part which is of shell-like or hat-like cross section and has an inner sill strength, the outer sill part and the inner sill part being connected to one another at respective upper and lower ends thereof via flanges which extend in the longitudinal direction;
   a middle sill part which is positioned between the outer sill part and the inner sill part, is of shell-like or hat-like cross section and has a middle sill strength, the middle sill part being connected to the inner sill part;
   wherein, in a region of a front section of the sill as viewed in the longitudinal direction of the vehicle, the outer sill part has a strength which is lower than a mean strength of the sill, which is dependent on the outer silt strength, the inner sill strength and the middle sill strength and masses thereof,
   wherein, in the region of the front section of the sill as viewed in the longitudinal direction of the vehicle, the middle sill part is shortened in the longitudinal direction in comparison with the outer sill part and the inner sill part and the middle sill part has a first extent which increases from front to rear in a transverse direction so as to form a first ramp-like contour which forms a sliding surface for a front wheel of the vehicle in case of a crash, and
   wherein, in a region of a rear section of the sill as viewed in the longitudinal direction of the vehicle, the middle sill part has a second extent which decreases from front to rear in the transverse direction so as to form a second ramp-like contour.

2. The silt as claimed in claim 1, wherein, in the region of the front section as viewed in the longitudinal direction of the vehicle, the inner sill part has a strength which is lower than the mean strength of the sill.

3. The sill as claimed in claim 1, wherein, in the region of the front section as viewed in the longitudinal direction of the vehicle, the middle sill part:
   has a strength which is lower than the mean strength of the sill; and
   is shortened in comparison with the outer sill part and the inner sill part.

4. The sill as claimed in claim 1, wherein:
   as viewed in the longitudinal direction, the outer sill part and the inner sill part have identical dimensions;
   in the front section in which the middle sill part does not extend, the inner sill part has a lower strength than the mean strength of the sill;
   and
   in the region of the front section of the sill, the outer sill part has a lower strength than the mean strength of the sill.

5. The sill as claimed in claim 1, wherein the sections with different strength of the outer sill part, inner sill part and/or middle sill part are configured by a thermal treatment which is different in sections of the respective sill part.

6. The sill as claimed in claim 1, wherein the sections with different strength of the outer sill part, inner sill part and/or middle sill part are configured by welding different materials together.

7. The sill as claimed in claim 1, wherein the middle sill part is connected to the inner sill part and to the outer sill part.

8. The sill as claimed in claim 1, wherein the middle sill part is connected exclusively to the inner sill part.

9. A body structure of a vehicle, having a sill as claimed in claim 1 which extends substantially in the longitudinal direction of the vehicle.

10. A sill for a body structure of a vehicle, the sill, in an installed state, extending substantially in a longitudinal direction of the vehicle, the sill comprising:
    an outer sill part which is of shell-like or hat-like cross section and has an outer sill strength;
    an inner sill part which is of shell-like or hat-like cross section and has an inner sill strength, the outer sill part and the inner sill part being connected to one another at respective upper and lower ends thereof via flanges that extend in the longitudinal direction; and
    a middle sill part including a middle segment that extends in the longitudinal direction and a vertical direction of the vehicle, upper and lower flanges that extend in the longitudinal and the vertical directions of the vehicle, and upper and lower connecting segments that extend in the longitudinal direction and in a transverse direction of the vehicle so as to connect the upper and lower flanges to the middle segment,
    wherein the middle sill part is positioned between the outer sill part and the inner sill part, is of shell-like or hat-like cross section, and has a middle sill strength,
    wherein the middle sill part contacts the inner sill part only along the upper and lower flanges of the middle sill part.

11. The sill as claimed in claim 10, wherein:
    as viewed in the longitudinal direction, the outer sill part and the inner sill part have identical dimensions;
    in a region of a front section of the sill as viewed in the longitudinal direction, the middle sill part is shortened in comparison with the outer sill part and the inner sill part such that there is a portion of the front section in which the outer and inner sill parts extend and in which the middle sill part does not extend.

12. The sill as claimed in claim 11, wherein in the region of the front section, the middle segment of the middle sill part has a ramp-like contour with an extent which increases from front to rear as viewed in a transverse direction.

13. The sill as claimed in claim 12, wherein in region of the front of the sill:
the outer sill part has a strength which is lower than a strength of the outer sill in a middle section of the sill as viewed in the longitudinal direction of the vehicle and a strength of the outer sill in a rear section of the sill as viewed in the longitudinal direction of the vehicle, and
the inner sill part has a strength which is lower than a strength of the inner sill in the middle section and a strength of the inner sill in the rear section.

14. The sill as claimed in claim 13, wherein the lower strength of the outer sill part in the front section results from a heat treatment applied to the outer sill part in the front section, and
wherein the lower strength of the inner sill part in the front section results from a heat treatment applied to the inner sill part in the front section.

15. The sill as claimed in claim 12, wherein, in a region of a rear section of the sill as viewed in the longitudinal direction of the vehicle, the middle segment of the middle sill part has a ramp-like contour with an extent which decreases from front to rear in a transverse direction.

16. The sill as claimed in claim 15, wherein the upper connecting segment slopes vertically downwards as it extends in the transverse direction from the upper flange to the middle segment and the lower connecting segment slopes vertically upwards as it extends in the transverse direction from the lower flange to the middle segment such that a height, in the vertical direction, of the ramp-like contour in the region of the front section decreases as the extent of the ramp-like contour increases in the transverse direction and such that a height, in the vertical direction, of the ramp-like contour in the region of the rear section increases as the extent of the ramp-like contour decreases in the transverse direction.

17. The sill as claimed in claim 10, wherein a cavity is configured between the middle segment of the middle sill part, the upper and lower connecting segments of the middle sill part, and the inner sill part.

18. The sill as claimed in claim 17, wherein the middle sill part is configured such that the cavity has openings at the front and rear of the sill.

19. The sill as claimed in claim 18, wherein the openings are closed off by closing plates.

20. The sill as claimed in claim 10, wherein the upper connecting segment slopes vertically downwards as it extends in the transverse direction from the upper flange to the middle segment, and
wherein the lower connecting segment slopes vertically upwards as it extends in the transverse direction from the lower flange to the middle segment.

* * * * *